(12) United States Patent
Bisegna et al.

(10) Patent No.: US 11,803,533 B2
(45) Date of Patent: Oct. 31, 2023

(54) UPDATING MULTIPLE DATA RECORDS IN A DATABASE

(71) Applicant: Amadeus S.A.S., Biot (FR)

(72) Inventors: Tony Bisegna, Antibes (FR); Laurent Azemard, Nice (FR); M'hammed Lahia, Mandelieu-la-Napoule (FR); Minh Dung Dang, Hanoi (VN); Xavier Bourgouin, Antibes (FR)

(73) Assignee: Amadeus S.A.S., Biot (FR)

( * ) Notice: Subject to any disclaimer, the term of this patent is extended or adjusted under 35 U.S.C. 154(b) by 359 days.

(21) Appl. No.: 17/311,888

(22) PCT Filed: Dec. 19, 2019

(86) PCT No.: PCT/EP2019/086422
§ 371 (c)(1),
(2) Date: Jun. 8, 2021

(87) PCT Pub. No.: WO2020/127806
PCT Pub. Date: Jun. 25, 2020

(65) Prior Publication Data
US 2022/0027336 A1   Jan. 27, 2022

(30) Foreign Application Priority Data
Dec. 20, 2018   (FR) ..................................... 1873627

(51) Int. Cl.
*G06F 16/23* (2019.01)
(52) U.S. Cl.
CPC ...... *G06F 16/2308* (2019.01); *G06F 16/2365* (2019.01); *G06F 16/2379* (2019.01)

(58) Field of Classification Search
CPC ............ G06F 16/2308; G06F 16/2379; G06F 16/2365
See application file for complete search history.

(56) References Cited

U.S. PATENT DOCUMENTS

2003/0055807 A1* 3/2003 Lomet ................. G06F 16/2477
2004/0225915 A1* 11/2004 Johnson .............. G06F 11/2007
714/13

(Continued)

OTHER PUBLICATIONS

Huang et al., "Experimental Evaluation of Real-Time Optimistic Concurrency Control Schemes", 17th International Conference on Very Large Data Bases, Sep. 1991, Barcelona, Spain, pp. 35-46.

(Continued)

*Primary Examiner* — Huawen A Peng
(74) *Attorney, Agent, or Firm* — Thompson Hine LLP

(57) ABSTRACT

Updating multiple data records in a database system with at least one database and a first server comprises creating a first session and loading, within the first session, the multiple data records stored by the database into a memory of the first server. Update at least a first and a second of the multiple data records during the first session in the memory of the first server. A database transaction mechanism writes back the multiple data records after updating the at least first and second data records to the database which insures that either all or none of the updated database records are committed. The database transaction mechanism includes a write lock over the first and second data records stored in the database.

19 Claims, 4 Drawing Sheets

(56) References Cited

U.S. PATENT DOCUMENTS

| | | | |
|---|---|---|---|
| 2007/0219999 A1* | 9/2007 | Richey | G06F 16/2329 |
| 2009/0198657 A1* | 8/2009 | Hattori | G06F 16/278 |
| 2013/0132335 A1* | 5/2013 | Yang | G06F 16/23 707/E17.005 |
| 2014/0297611 A1* | 10/2014 | Abbour | G06F 16/2343 707/703 |
| 2016/0292203 A1* | 10/2016 | Tsujikawa | G06F 16/2358 |
| 2016/0299949 A1* | 10/2016 | Konik | G06F 16/24542 |
| 2018/0150498 A1* | 5/2018 | Shimizu | G06F 16/2329 |

OTHER PUBLICATIONS

Microsoft.com, "Transaction Isolation Levels", Jan. 19, 2017, retrieved from the internet at https://docs.microsoft.com/en-us/sql/odbc/reference/develop-app/transaction-isolation-levels?view=sql-server-ver15.

Elmasri et al., "Fundamentals of Database Systems", Fourth Edition, Copyright 2004 by Pearson Education, Inc., Chapters 17-19.

Garcia-Molina et al., "The Worlds Of Database Systems", in Database Systems: The Complete Book, Pearson Education International, Copyright 2002, Chapter 1.

European Patent Office, International Search Report and Written Opinion dated Feb. 20, 2020 in PCT/EP2019/086422.

* cited by examiner

[Fig. 1]
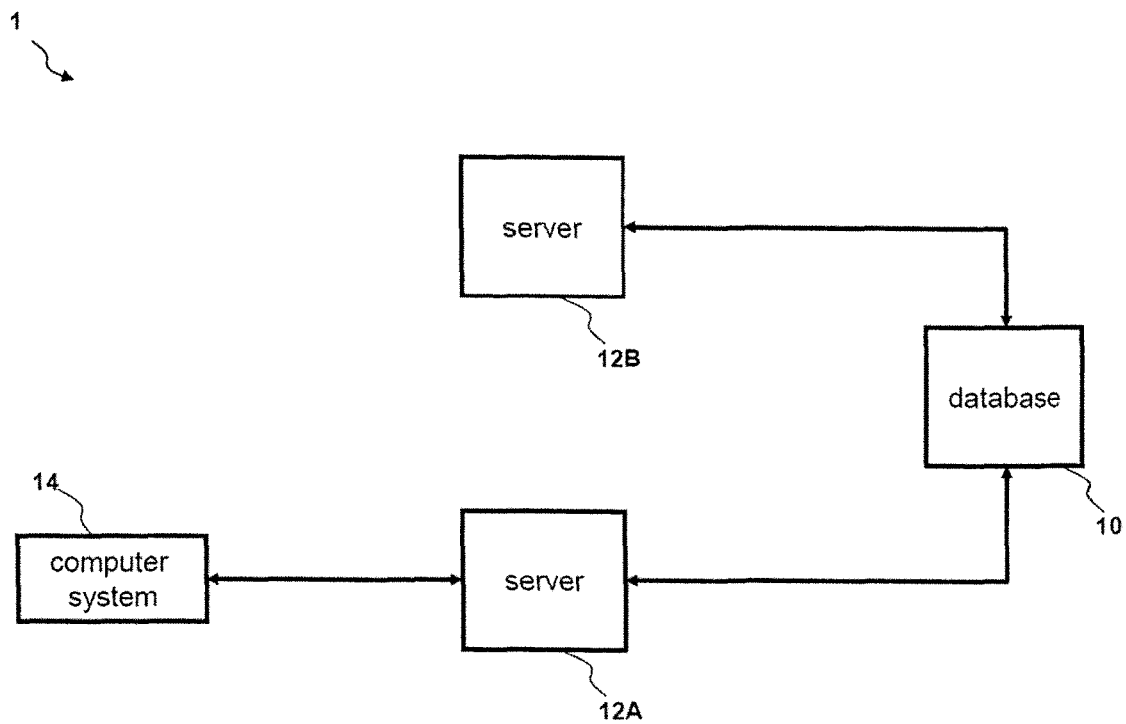
[Fig. 2]
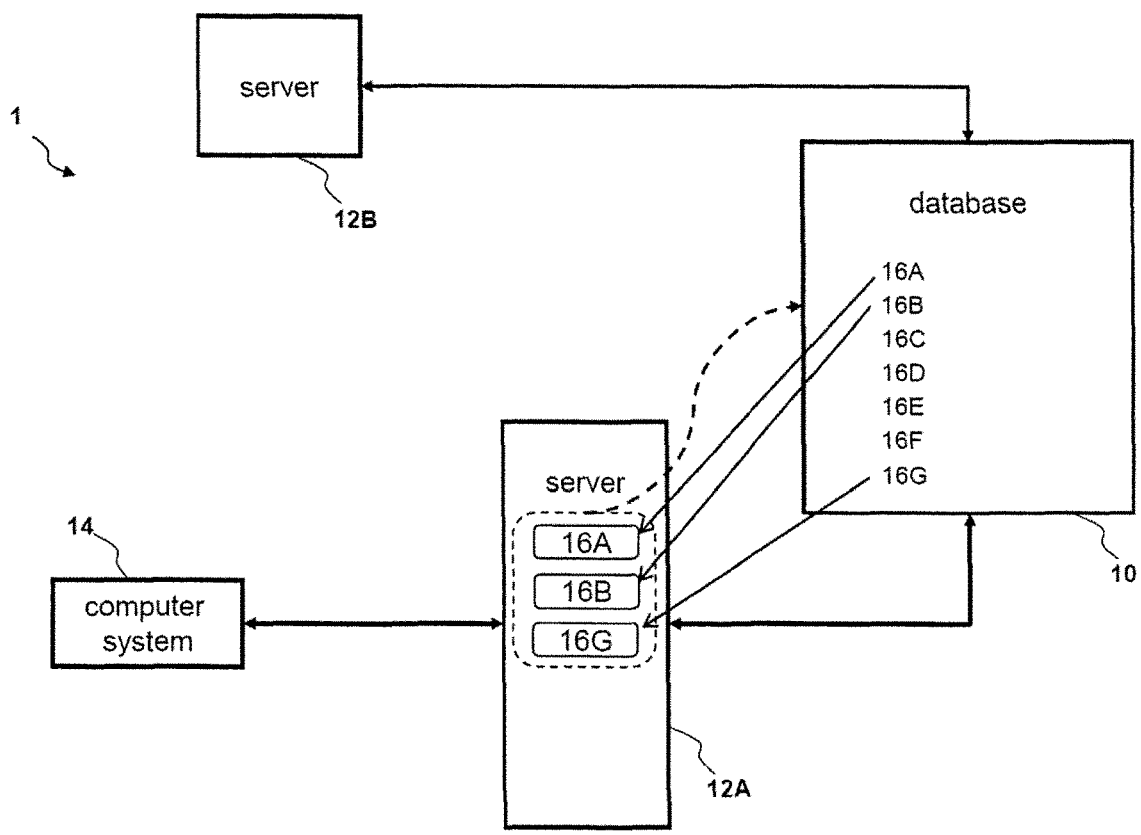

[Fig. 3]
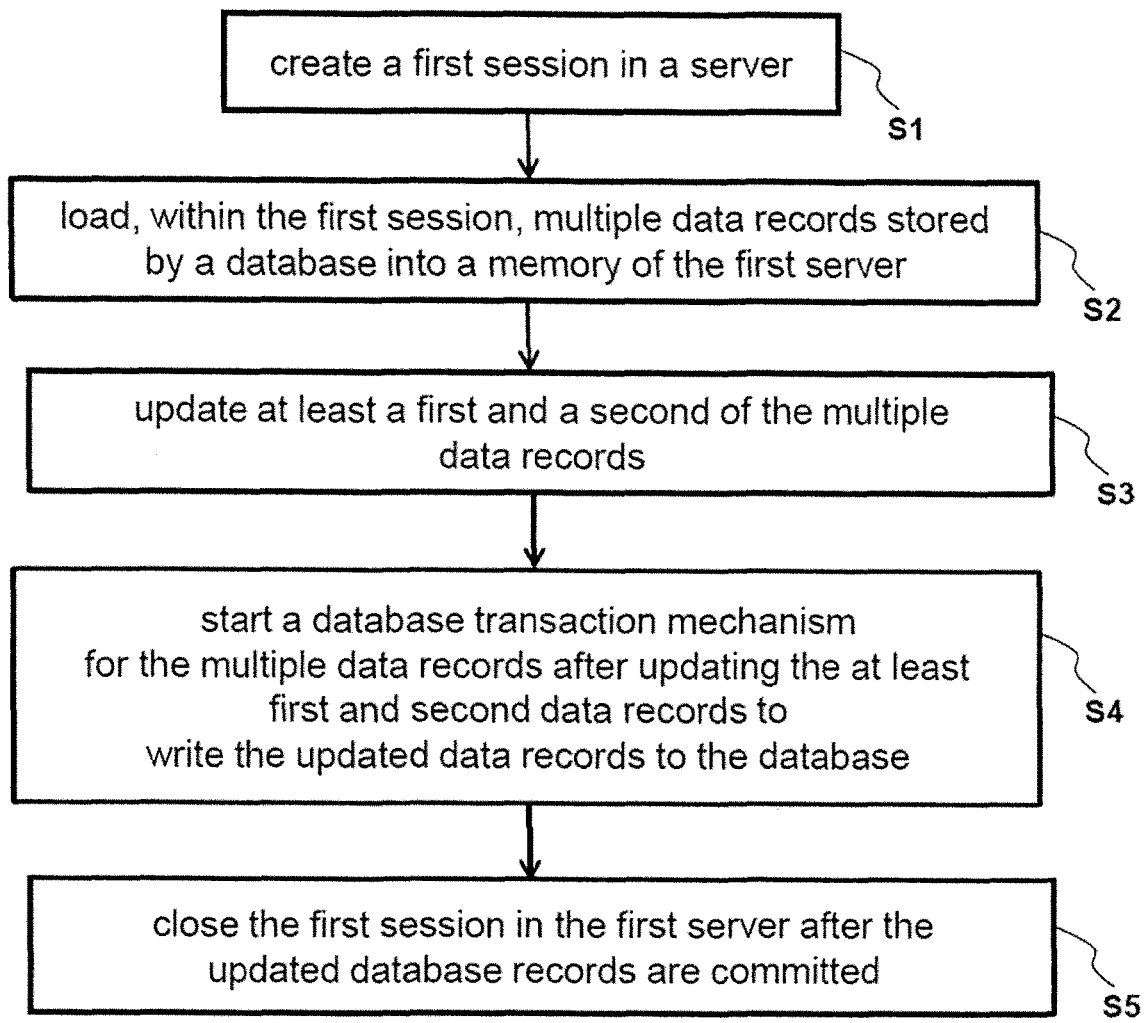

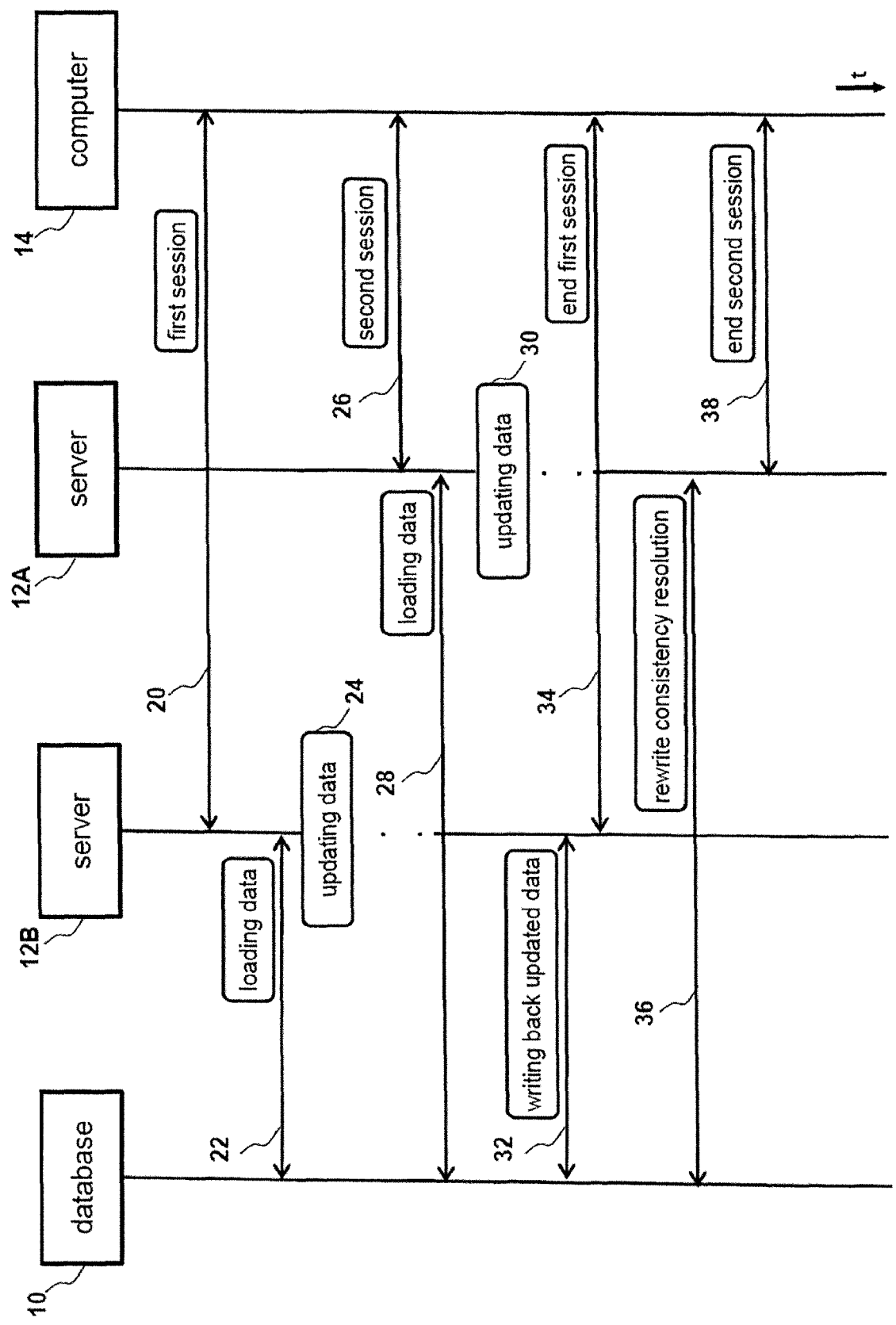
[Fig. 4]

[Fig. 5]
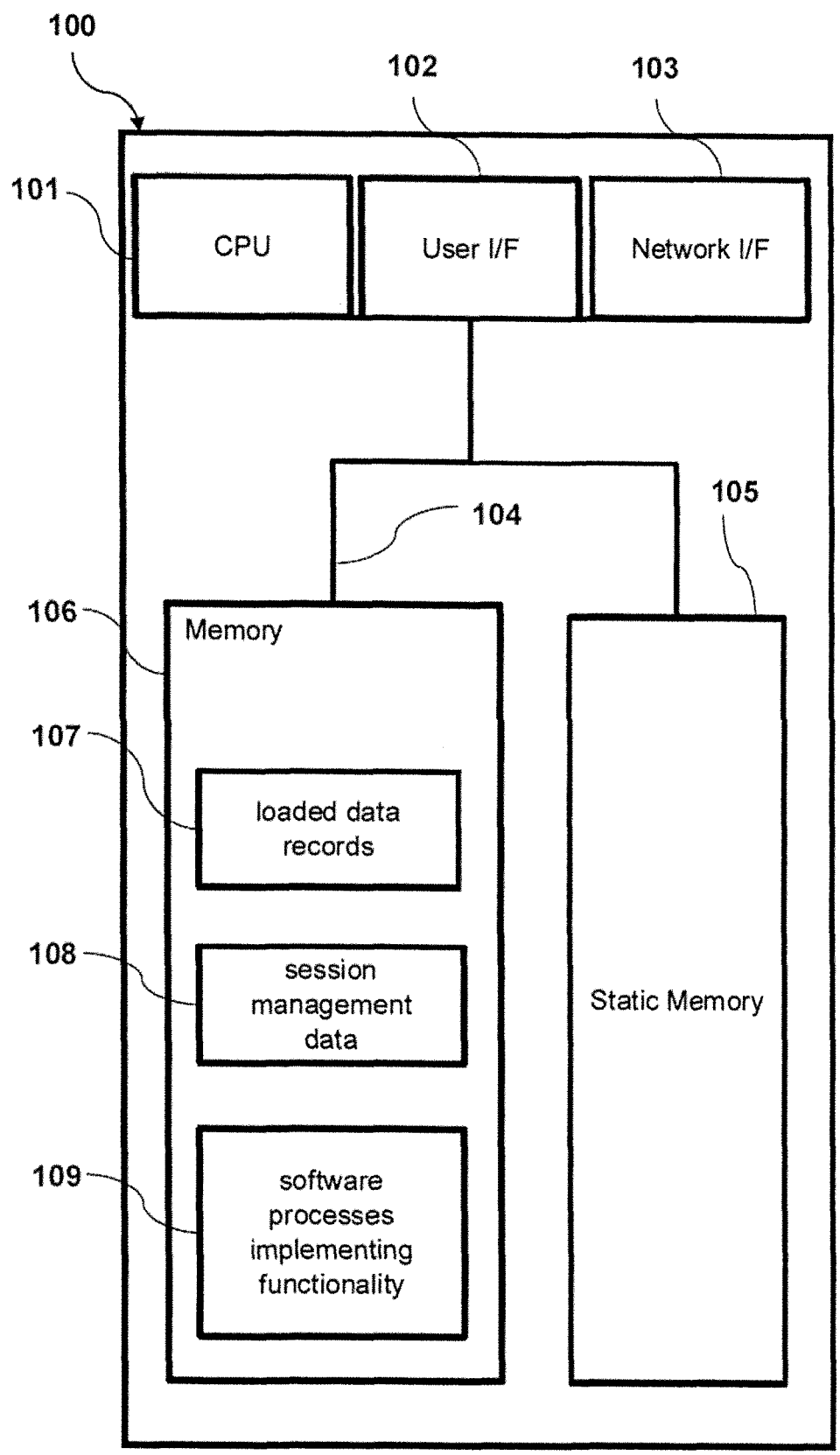

UPDATING MULTIPLE DATA RECORDS IN A DATABASE

The invention generally relates to computers and computer software, and in particular to methods, systems, and computer program products for updating multiple data records in a database.

Databases have a plurality of data records stored therein. Data records stored within a database might be read only or might be changed by a write command. More often, a database may be accessed by many different remote users. Lock mechanisms prevent that different users change a data record at the same time.

Database transactions allow effectuating updates on a plurality of separate data records in a consistent manner. Either all data records comprised in a database transaction are updated or none. During a database transaction all data records comprised in the transaction are locked. Too many transactions at a time or too long lasting transactions may therefore affect the performance of the database.

Thus, improved systems, methods, and computer program products for updating multiple data records in a database are needed that do not affect the performance of the database.

According to a first aspect, a method of updating multiple data records in a database system is provided. The database system comprises at least one database and a first server. According to the method, a first session is created in the first server. Within the first session the multiple data records stored by the database are loaded into a memory of the first server. The method further comprises updating at least a first and a second of the multiple data records during the first session in the memory of the first server and starting a database transaction mechanism for the multiple data records after updating the at least first and second data records to write the updated data records to the database which insures that either all or none of the updated database records are committed. The database transaction mechanism includes a write lock over the first and second data records stored in the database. The first session in the first server is closed after the updated database records are committed.

Further aspects comprise:
loading and updating the multiple data records without setting the write lock over the multiple data records in the database
updating at least the first and second data records further comprises setting at least one of the multiple data records as active data record and applying updates to the data records set as active data records.

In another aspect, the method further comprises sending a request to a further database.

In another aspect any one of the methods recited above comprises creating, within the first session, a new data record, wherein the new data record is committed together with the multiple data records.

In a further aspect creating the new data record comprises merging the first data record and the second data record In another aspect any one of the methods recited above comprises within a second session at the first server or at a second server running concurrently to the first session, loading at least the first data record stored by the database into the memory of the first server or a memory of the second server, and updating at least the first data record in the memory of the first or second server within the second session while the first data record is also updated within the first session, and after the updated first data record was rewritten to the database from the first session, in response to a commit attempt to rewrite the first data record updated within the second session to the database, employing a rewrite consistency resolution mechanism during the transaction mechanism.

In a further aspect the rewrite consistency resolution mechanism is one of denying the commit attempt to rewrite the first data record updated within the second session to the database, reloading the first data record from the database and continuing the second session, and merging the updated first data record updated in the second session with the first data record rewritten to the database from the second session.

In another aspect, a server is configured to create a first session in a first server; load, within the first session, the multiple data records stored by the database into a memory of the first server; update at least a first and a second of the multiple data records during the first session in the memory of the first server; start a database transaction mechanism for the multiple data records after updating the at least first and second data records to write the updated data records to the database which insures that either all or none of the updated database records are committed, wherein the database transaction mechanism includes a write lock over the first and second data records stored in the database; close the first session in the first server after the updated database records are committed.

In another aspect, a computer program for updating multiple data records in a database is provided comprising program code that, when executed by one or more processors of a first server, causes the processors to: create a first session in the first server; load, within the first session, the multiple data records stored by the database into a memory of the first server; update at least a first and a second of the multiple data records during the first session in the memory of the first server; start a database transaction mechanism for the multiple data records after updating the at least first and second data records to write the updated data records to the database which insures that either all or none of the updated database records are committed, wherein the database transaction mechanism includes a write lock over the first and second data records stored in the database; close the first session in the first server after the updated database records are committed. In other words, a computer program is provided comprising program code instructions for executing any of the above cited methods when said program is executed on a computer.

The accompanying drawings illustrate various embodiments and, together with the general description of the invention given above, and the detailed description of the embodiments given below, serve to explain the embodiments.

FIG. 1 shows in a simplified diagram an exemplary database system;

FIG. 2 illustrates in a simplified diagram loading and committing data records;

FIG. 3 is a flow diagram illustrating a data record update method described herein.

FIG. 4 visualizes updating data record by two concurrent sessions.

FIG. 5 is a diagrammatic representation of the internal components of a computing machine according to some embodiments.

FIG. 1 shows a simplified diagram of an exemplary database system 1. The database system 1 may comprise a database 10, a first server 12A, a second server 12B and a further computer system 14.

The database 10 may be any database as e.g. an Oracle® database. Database 10 may store a multitude of data records. A plurality of users may access database 10 to read or to update data records.

Database system 1 comprises two servers 12A and 12B. The database system 1 may comprise more servers. The database system 1 may comprise only one server. The server or the servers 12A and 12B may be remote from database 10. Servers 12A and 12B may be able to access database 10 via bidirectional communication lines. Servers 12A and 12B may access database 10 via a communication network as e.g. the Internet. Servers 12A and 12B may be remote from each other. Servers 12A and 12B may be independent from each other. Server 12A and/or server 12B may be comprised in a data processing system.

Database system 1 as illustrated comprises a computer system 14. It is to be understood that database system 1 does not necessarily comprise the computer system 14. Computer system 14 may be another database. Computer system 14 may be a server comprising a software program realizing e.g. a booking engine, a reservation engine or any other application engine. Servers 12A and 12B may be configured to access computer system 14. An update on a data record may be dependent on a client request sent to computer system 14.

FIG. 2 shows a detail of database system 1. FIG. 2 shows server 12A and database 10. Database system 1 could be limited to the server 12A and database 10. Data records 16A, 16B, . . . 16G may be stored in database 10. A user (e.g. an application running on computer system 14) may intend to update several data records stored in database 10. The user may have the requirement that either all updates to the data records or none of the updates is effectuated. The user may use server 12A. The user may create at server 12A a first session. The first session may allow the user to load any number of data records from database 10. The first session may prompt the user to indicate data records to be loaded. The user may pass a command in the first session loading the data records to modify into a memory (e.g. a cache) of the first server 12A. The user may use an application programming interface (API) or, in the case of a human user, a command line as follows to create the first session and to load three data records:

>spmulti/rtT9XSNP, KP6YFP, JTY4NT

The three data records are read from the database. No changes are effectuated to the data records in the database. No lock mechanism (i.e. neither read lock nor write lock) is activated in the database 10. As illustrated in FIG. 2, copies of data records 16A, 16B and 16G are loaded into the memory of server 12A. Original data records 16A, 16B and 16G are still maintained in database 10, in an unlocked state, i.e. accessible by other users. Loading the three data records 16A, 16B and 16G may be effectuated by three separate read processes without a database transaction mechanism. The three separate read processes may be automatically performed within the first session in response to entering the names of the data records in the first session.

The first session may allow setting any of the loaded data records as active data records. The user may set a first of the data records 16A, 16B and 16G as active data record. The user may select one or more data records as active. The first session may display content of the active data record(s) in order to facilitate manipulation of the data record and its content. For example, for data records of a technical maintenance and repair database, the content may include an identification of a technical device under repair, failure diagnosis information, date information, an estimated time for repair, parts required for repair, free-text comments by a technician, etc. The user may select more than one data record to be an active data record. The user may manipulate the active data record(s) and update the active data record(s) within the first session.

A performed update may be valid for all active data records. The user may set first data record 16A as active and update the first data record 16A. The user may then set a second data record 16B as active and update the second data record 16B. Updating the first data record 16A and/or the second data record 16B may necessitate sending a request to computer system 14. The update may be dependent on a response to the request. It is to be understood that there may be more than one computer system and the update procedure may necessitate sending more than one request to more than one computer system. Updating the first and the second data record may be an iterative process. Any data record may be set more than once to be active and may be updated more than once. The first session provides an environment allowing the user to manipulate all loaded data records.

The first session may provide the possibility to create a new data record. The user may create a new data record. A new data record is a data record which is not loaded from the database 10. The user may create a new data record by merging two updated data records. The user may create a new data record by merging e.g. updated data record 16A and updated data record 16B. The user may create a new data record by merging an updated data record with a loaded but not updated data record. The user may finish the updating process.

The first session may provide the possibility to start a database transaction in order to write back the updated data records (including any potential newly generated record) back to database 10. Starting a database transaction within the first session may comprise grouping all data records 16A, 16B and 16G comprised in the first session together, allowing a single iteration of one or more database commands against each grouped data record. Grouping all data records together may comprise updated data records, unchanged data records and/or newly created data records. For example, in order to write back the changed and the newly generated data records, these records are grouped and a commit command is sent to the database 10 for group of the data records. Further, the data records or parts of the data records may be looped together so that multiple iterations of a series of database commands may be applied to each of the data records. The commands may refer e.g. to checking for inconsistencies and/or functional checks. FIG. 2 visualizes the grouping and/or looping by a broken line surrounding data records 16A, 16B and 16G. Starting a database transaction within the first session may comprise sending a commit command from server 12A to database 10 comprising the names of all grouped and/or looped data records as indicated in FIG. 2 by an arrow with broken line. Only one commit command is needed to commit all data records.

At database 10, receiving the commit command may start a database transaction under a common session ID. At database 10 all data records 16A, 16B and 16G corresponding to the names comprised in the received command may be locked. The data records may be write locked. The database 10 may create a lock table comprising the names. The database mechanism started by the commit command insures that either all or none of the updated database records 16A, 16B and 16G are committed. The data records 16A, 16B and 16G are only locked once the commit command is received at database 10.

The first session may be closed by the user once the data records 16A, 16B and 16G are committed.

FIG. 3 illustrates in a flow diagram different activities of the method according to an embodiment. First, a user creates a first session in a server (activity S1). The server may be remote to a database. The server may be coupled to the database via any kind of communication lines.

Then, (activity S2) multiple data records may be loaded from a database within the first session into a memory of the server. The multiple data records may have an interdependency for the user. The multiple data records may be independently stored from each other in the database and may be fetched independently from each other from the database. They are only read from the database. No lock occurs to the data records in the database.

At least a first and a second data record from the multiple data records is updated (activity S3). Updates may be performed sequentially or parallel to the first and second data records.

Once the updates are finished, the first session contacts the database to replace the still unchanged data records in the database by the updated data records (activity S4). Therefore a database transaction mechanism is started comprising all data records loaded into the memory of the server. The database transaction may further comprise data records created within the first session. The database transaction mechanism comprises a write lock mechanism over the data records loaded within the first session. The database transaction mechanism insures that either all or none of the updated database records are committed. With end of the database transaction all (or none) of the data records are changed in the database.

The first session is closed once all data records are committed (activity S5).

In some embodiments, a second session may be started independently from the first session. The second session may be started on first server 12A or on second server 12B or on another server. The second session may time-wise overlap the first session. As the data records 16A-16G are not locked after reading them into the first session, the second session may load the same three data records 16A, 16B and 16G in a memory of the respective server. As an example it may be assumed that the second session loads data records 16A and 16F. Again, no lock mechanism is started at the level of the database 10. No change to the data records as stored in database 10 is effectuated at this point.

During the second session, data records 16A and 16F may be updated, in the same manner as described above with respect to the first session. A database transaction may be started within the second session after the updates are completed. The database transaction may be started from the second session independently from the database transaction started from the first session.

In some embodiments, a rewrite consistency resolution mechanism during the transaction mechanism may be provided. In response to a commit attempt, first the originally retrieved data records (which have been maintained in the memory of the server 12B as well in addition to the updated version of the data records) may be compared to the corresponding data records in the database 10. If the data records as originally loaded into the memory of the server 12A respectively 12B are not identical to the actual data records in the database 10, the rewrite consistency resolution mechanism may be employed.

One example of the rewrite consistency resolution mechanism is a denial of the commit attempt. In response to the denial of the commit attempt, the session may be configured to reload the data record which has been identified as not being identical to the originally retrieved data record from database 10. The reloaded data record may then be merged within the session with the updated data record. A new commit attempt may be started.

In some embodiments of the rewrite consistency resolution mechanism, a changed data record in the database 10 may be merged earlier, i.e. not at commit time, but already after another session (e.g. the first session) committed changes of the data record to the database 10. In such embodiments, the respective session (e.g. the second session) may have information about the change of the data record in the database 10. For example, the session may periodically check in the database 10 whether or not the data record has been changed in the meantime by another session. More specifically, the second session may be configured to read periodically, i.e. after given time periods which may be adjustable, the data records 16A, 16B and 16 G, i.e. the data records loaded for update, from the database 10 independently from any commit attempt in order to check whether the data records have been changed in the database in the meantime by another session (e.g. the first session).

A change in the database 10 may have occurred in only a subset (e.g. only one) of the data records loaded for update. The change may have occurred in one or more of the data records before the loaded data record is effectively updated within the session. In this case, the changed data record may be merged with the loaded data record by replacing the previously loaded data record within the session. The change may have occurred in one or more of the data records after the loaded data record is updated within the session. In this case, the changed data record may be merged with the updated data record within the session as mentioned above. Both cases may occur within the same session as updating the different data records within a session may be effectuated independently from each other and may take time periods of varying duration.

In response to determining a change of the data record in the database 10, the session reloads the data record from the database 10 and merges the reloaded data record with the updated data record within the session already prior to the database transaction to commit the data record to the database 10. This provides for a faster and more efficient database commit transaction.

A further example of the rewrite consistency resolution mechanism is merging takes place at the level of the database 10 without any new commit attempt. Merging comprises incorporating the updates made within the second session into the version of the data currently stored in the database 10.

An example of the interrelation of multiple sessions accessing and updating the same data stored in the database 10 in accordance with the methodologies described herein is given by FIG. 4. Computer system 14 starts and maintains the first session with server 12B (activity 20). Within the first session, the server 12B loads the data to be managed and updated from the database 10 into the memory of the server 12B (activity 22). As described above, the loaded data may be data records 12A, 12B and 12G. The loaded data is then updated in the memory of the server 12B within the first session in response to respective commands from the computer system 14 (activity 24).

At some point after having the data is loaded within the first session (activity 22), the second session is started and maintained (activity 26). In the example of FIG. 4, the second session is started and maintained with the server 12A and also by computer system 14, but may be started and maintained by any other server (e.g. again by server 12B) and by any other computer system. Within the second session, data to be managed and updated is loaded from the database (activity 28), the data comprising at least one data record that has already previously been loaded from the database 10 within the first session by activity 22 (e.g. data record 16A as described above). The loaded data is then updated in the memory of the server 12A within the second session in response to respective commands from the computer system 14 (activity 30).

Referring back to the first session, after updating the data in the memory of the server 12B has been concluded, the updated data is written back to the database 10 (activity 32). In the assumed scenario of FIG. 4, at least one of the data records also loaded by the second session has been updated within the first session (e.g. data record 16A of FIG. 2). As described above, writing back 32 may utilize a state-of-the-art database transaction. Assuming that none of the data updated within the first session has been loaded from the database 10 by any other session before and was not yet written back before the time of loading 22, the write back commit will be successful and all updated data records of the first session are written back to the database 10 in a consistent manner. The first session is then terminated (activity 34).

At some point later, after the updated data of the first session has been written back to the database 10 by activity 32, the data update of the second session is concluded and attempt is made to write back the updated data of the second session to the database 10. In the assumed scenario of FIG. 4, at least one data record which has been updated and written back to the database 10 by the first session is also updated within the second session. In this case, write back is not successful at the outset, but a rewrite consistency resolution 36 is employed. As described above, rewrite consistency resolution 36 may include denying the write back attempt at reloading the changed data from the database 10 to the second session and repeating the updates to the re-loaded data. In another example, a merging mechanism is employed ensuring data consistency in the database 10 by incorporating the updates made in the second session into the versions of the data currently stored in the database 10. In one way or the other, after the rewrite consistency resolution 36 has been successfully concluded, the second session is terminated (activity 38).

FIG. 5 is a diagrammatic representation of the internal component of a computing machine 100 representing e.g. any of the servers 12A, 12B. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A video display, an alpha-numeric input device and a cursor control device may be provided as examples of user inter-face 102. The network interface device 103 connects the computing machine 100 to other components of the database system such as database 10 and further computer system 14.

The memory 106 of the computing machine 100 may include a memory area 107 storing the retrieved data (such as data records 16A, 16B and 16G of FIG. 2). In another area 108 of the memory 106, session management data such as session IDs and session state data defining currently active sessions with computer system 14 may be stored. In still another area 109 of the memory 106, software processes realizing the currently active functionality such as the interaction with the database 10 (loading and writing back) as well as updating data and processing commands within currently active sessions may be stored. The memory 106 within the present embodiments may be composed of hardware and software components that store the data records. There can be hardware-based caches such as CPU caches, GPU caches, digital signal processors and translation lookaside buffers, as well as software-based caches such as page caches, web caches (HTTP caches) etc.

The computing machine hosting database 10 as well as the computer system 14 may be implemented by a similar computing machine 100 as shown by FIG. 5.

The invention claimed is:

1. A method of updating multiple data records in a database system comprising at least one database and a first server, the method comprising:
creating a first session in the first server;
loading, within the first session, the multiple data records stored by the database into a memory of the first server without activating a lock mechanism in the database;
updating a first data record and a second data record of the multiple data records during the first session in the memory of the first server;
starting a database transaction mechanism for the multiple data records after updating the first data record and the second data record to write the updated data records to the database which ensures that either all or none of the updated database records are committed, wherein the database transaction mechanism includes a write lock over the first data record and the second data record stored in the database; and
closing the first session in the first server after the updated database records are committed.

2. The method of claim 1, wherein the multiple data records are loaded and updated without setting the write lock over the multiple data records in the database.

3. The method of claim 1, wherein updating the first data record and the second data record further comprises:
setting at least one of the multiple data records as an active data record; and
applying updates to the data records set as active data records.

4. The method of claim 1, wherein updating the first data record and the second data record further comprises:
sending a request to a further database.

5. The method of claim 1, further comprising:
creating, within the first session, a new data record,
wherein the new data record is committed together with the multiple data records.

6. The method of claim 5, wherein creating the new data record comprises
merging the first data record and the second data record.

7. The method of claim 1, further comprising:
within a second session at the first server or at a second server running concurrently to the first session, loading the first data record stored by the database into the memory of the first server or a memory of the second server;
updating the first data record in the memory of the first server or the memory of the second server within the second session while the first data record is also updated within the first session; and
after the updated first data record is rewritten to the database from the first session and in response to a commit attempt to rewrite the first data record updated within the second session to the database, employing a rewrite consistency resolution mechanism during the transaction mechanism.

8. The method of claim 7, wherein the rewrite consistency resolution mechanism comprises:
denying the commit attempt to rewrite the first data record updated within the second session to the database.

9. The method of claim 7, wherein the rewrite consistency resolution mechanism comprises:
reloading the first data record from the database and continuing the second session.

10. The method of claim 7, wherein the rewrite consistency resolution mechanism comprises:
merging the updated first data record updated in the second session with the first data record rewritten to the database from the second session.

11. A system for updating multiple data records in a database, the system comprising:
a server configured to:
create a first session in the server;
load, within the first session, multiple data records stored by the database into a memory of the server without activating a lock mechanism in the database;
update a first data record and a second data record of the multiple data records during the first session in the memory of the server;
start a database transaction mechanism for the multiple data records after updating the first data record and the second data record to write the updated data records to the database which ensures that either all or none of the updated database records are committed, wherein the database transaction mechanism includes a write lock over the first data record and the second data record stored in the database; and
close the first session in the server after the updated database records are committed.

12. The system of claim 11, wherein the multiple data records are loaded and updated without setting the write lock over the multiple data records in the database.

13. The system of claim 11, wherein the server is configured to update the first data record and the second data record by:
setting at least one of the multiple data records as an active data record; and
applying updates to the data records set as active data records.

14. The system of claim 11, wherein the server is configured to update the first data record and the second data record by:
sending a request to a further database.

15. The system of claim 11, wherein the server is further configured to:
create, within the first session, a new data record,
wherein the new data record is committed together with the multiple data records.

16. The system of claim 15, wherein the server is configured to update the first data record and the second data record by:
merging the first data record and the second data record.

17. The system of claim 11, wherein the server is configured to:
within a second session at the first server or at a second server running concurrently to the first session, load at least the first data record stored by the database into the memory of the first server or a memory of the second server;
update at least the first data record in the memory of the first server or the memory of the second server within the second session while the first data record is also updated within the first session; and
after the updated first data record was rewritten to the database from the first session and in response to a commit attempt to rewrite the first data record updated within the second session to the database, employ a rewrite consistency resolution mechanism during the transaction mechanism.

18. The system of claim 17, wherein the rewrite consistency resolution mechanism comprises:
denying the commit attempt to rewrite the first data record updated within the second session to the database;
reloading the first data record from the database and continuing the second session; and
merging the updated first data record updated in the second session with the first data record rewritten to the database from the second session.

19. A non-transitory computer-readable storage medium comprising instructions that upon execution by a processor of a computing device cause the computing device update multiple data records in a database, wherein the instructions comprise:
create a first session in the server;
load, within the first session, multiple data records stored by the database into a memory of the server without activating a lock mechanism in the database;
update a first data record and a second data record of the multiple data records during the first session in the memory of the server;
start a database transaction mechanism for the multiple data records after updating the first data record and the second data record to write the updated data records to the database which ensures that either all or none of the updated database records are committed, wherein the database transaction mechanism includes a write lock over the first data record and the second data record stored in the database; and
close the first session in the server after the updated database records are committed.

* * * * *